(12) United States Patent
Kubo et al.

(10) Patent No.: US 8,883,949 B2
(45) Date of Patent: Nov. 11, 2014

(54) BINDER RESIN FOR TONER

(75) Inventors: Takashi Kubo, Wakayama (JP);
Norihiro Fukuri, Wakayama (JP);
Yasunori Inagaki, Wakayama (JP)

(73) Assignee: Kao Corporation, Tokyo (JP)

( * ) Notice: Subject to any disclaimer, the term of this patent is extended or adjusted under 35 U.S.C. 154(b) by 69 days.

(21) Appl. No.: 13/499,309

(22) PCT Filed: Sep. 30, 2010

(86) PCT No.: PCT/JP2010/067149
§ 371 (c)(1),
(2), (4) Date: Mar. 30, 2012

(87) PCT Pub. No.: WO2011/040570
PCT Pub. Date: Apr. 7, 2011

(65) Prior Publication Data
US 2012/0184701 A1    Jul. 19, 2012

(30) Foreign Application Priority Data
Oct. 2, 2009 (JP) .................................. 2009-230646

(51) Int. Cl.
*C08L 97/00* (2006.01)
*C08G 63/672* (2006.01)
*C08L 67/02* (2006.01)
*G03G 9/087* (2006.01)

(52) U.S. Cl.
CPC ........ *G03G 9/08759* (2013.01); *G03G 9/08755* (2013.01); *C08G 63/672* (2013.01); *C08L 67/02* (2013.01); *G03G 9/08757* (2013.01); *C08L 97/00* (2013.01)
USPC ......................................... 527/400; 527/103

(58) Field of Classification Search
None
See application file for complete search history.

(56) References Cited

U.S. PATENT DOCUMENTS

| | | | | |
|---|---|---|---|---|
| 4,042,546 A * | 8/1977 | Simon | ............................ | 527/400 |
| 4,803,255 A * | 2/1989 | Pruett et al. | .................... | 527/400 |
| 5,714,542 A * | 2/1998 | Niinae et al. | .................. | 525/108 |
| 6,077,639 A | 6/2000 | Semura et al. | | |
| 7,514,139 B2 * | 4/2009 | Ishida et al. | ............... | 428/304.4 |
| 2001/0016614 A1 * | 8/2001 | Yamaguchi et al. | ............ | 524/13 |
| 2006/0182922 A1 * | 8/2006 | Ishida et al. | .................... | 428/44 |
| 2007/0261596 A1 | 11/2007 | Fechner et al. | | |
| 2008/0051539 A1 * | 2/2008 | Kelly | ............................. | 526/199 |
| 2009/0169867 A1 * | 7/2009 | Kelly | ............................. | 428/326 |
| 2010/0124441 A1 | 5/2010 | Ariyoshi et al. | | |

FOREIGN PATENT DOCUMENTS

| | | |
|---|---|---|
| CN | 1993436 A | 7/2007 |
| CN | 101738886 A | 6/2010 |
| EP | 0463822 B1 * | 3/1996 |
| JP | 3-83069 | 4/1991 |
| JP | 5-216271 | 8/1993 |
| JP | 2000-172008 | 6/2000 |
| JP | 2008-129188 | 6/2008 |

OTHER PUBLICATIONS tLignin Chemistry—Past, Present and Future, Alder, Erich, Wood Sci Technology. 11: 169-218 (1977).*
U.S. Appl. No. 13/498,501, filed Mar. 27, 2012, Fukuri, et al.
U.S. Appl. No. 13/498,471, filed Mar. 27, 2012, Fukuri, et al.
International Search Report issued Oct. 26, 2010 in Application No. PCT/JP2010/067149.
Combined Chinese Office Action and Search Report issued Feb. 25, 2013 in Patent Application No. 201080041603.6 with English Translation of Category of Cited Documents.

* cited by examiner

*Primary Examiner* — James J Seidleck
*Assistant Examiner* — Peter A Salamon
(74) *Attorney, Agent, or Firm* — Oblon, Spivak, McClelland, Maier & Neustadt, L.L.P.

(57) ABSTRACT

A resin binder for a toner obtained by polycondensing a carboxylic acid component and an alcohol component in the presence of a lignin compound; a toner for electrophotography, containing the resin binder; and a method for producing a resin binder for a toner, including the step of polycondensing a carboxylic acid component and an alcohol component in the presence of a lignin compound. The resin binder for a toner of the present invention is suitably used as a resin binder of a toner used in development of latent images formed in electrophotography, electrostatic recording method, electrostatic printing method or the like.

19 Claims, No Drawings

BINDER RESIN FOR TONER

TECHNICAL FIELD

The present invention relates to a resin binder for a toner usable in development of latent images formed in, for example, electrophotography, an electrostatic recording method, an electrostatic printing method, or the like, a method for producing the resin binder, and a toner for electrophotography containing the resin binder.

BACKGROUND ART

In recent years, with the advancements in speed-up and energy conservation of the machines, toners having excellent low-temperature fixing ability are in demand. In view of the above, as a resin binder for use in a toner, numerous studies on polyesters testing for excellent low-temperature fixing ability are made.

On the other hand, studies on those using lignin compounds using raw materials from a plant source are also made.

Patent Publication 1 discloses, as an objective of inexpensively obtaining a natural color brown and at the same time having environmental resistance and background fogging, a color toner characterized in that a compound having a phenylpropane backbone is blended.

Patent Publication 2 discloses, as an objective of having sufficient offset resistance and low-temperature fixing ability upon fusing, and also being free from generating winding around a fixing roller, a toner for electrostatic image development, characterized in that the toner contains, as a binder component, a resin obtained by subjecting lignin and cellulose to an esterification treatment or etherification treatment.

Patent Publication 3 discloses, as an objective of providing a toner for electrophotography having a very low environmental burden during production and upon discarding, without lowering image quality, characterized in that the toner contains a resin binder comprising a biodegradable polymer, a releasing agent comprising a plant-based natural wax, a colorant comprising a food pigment, and a charge control agent comprising a natural mineral.

PRIOR ART REFERENCES

Patent Publications

Patent Publication 1: Japanese Patent Laid-Open No. Hei-3-83069
Patent Publication 2: Japanese Patent Laid-Open No. Hei-5-216271
Patent Publication 3: Japanese Patent Laid-Open No. 2008-129188

SUMMARY OF THE INVENTION

Problems to be Solved by the Invention

However, in the toners meeting the demands of speeding-up of the machines, further improvements in durability as well as in low-temperature fixing ability and storage property are earnestly desired.

The present invention relates to a resin binder for a toner capable of improving durability of the toner, while maintaining its low-temperature fixing ability and storage property, and a method for producing the resin binder, and a toner for electrophotography containing the resin binder.

Means to Solve the Problems

The present invention relates to:
[1] a resin binder for a toner obtained by polycondensing a carboxylic acid component and an alcohol component in the presence of a lignin compound;
[2] a toner for electrophotography, containing the resin binder as defined in the above [1]; and
[3] a method for producing a resin binder for a toner, including the step of polycondensing a carboxylic acid component and an alcohol component in the presence of a lignin compound.

Effects of the Invention

The toner for electrophotography of the present invention which contains a resin binder for a toner exhibits some excellent effects in durability as well as in its low-temperature fixing ability and storage property.

MODES FOR CARRYING OUT THE INVENTION

The resin binder for a toner of the present invention is obtained by polycondensing a carboxylic acid component and an alcohol component in the presence of a lignin compound, whereby durability of the toner can be improved while maintaining its low-temperature fixing ability and storage property. This is presumably due to the fact that the lignin compound, as mentioned below, is a polymeric compound having a three-dimensional network structure, the polymeric compound having a functional group such as a hydroxyl group or a carboxy group, and the lignin compound can be partly polycondensed with the carboxylic acid component or the alcohol component, so that the polyester resin has an increased molecular weight with the compound, thereby improving durability of the toner. In addition, according to the method of the present invention, it is deduced that the lignin compound is more likely to be finely dispersed in the polyester produced by polycondensing the alcohol component and the carboxylic acid component, thereby consequently improving hardness of the toner, and improving durability of the toner.

The lignin is one of three components constituting wood such as a plant or lumber, i.e. lignin, cellulose and hemicellulose, which are collectively referred to as lignocellulose, and the lignin is a polymeric compound obtained by polycondensing constituting units having a hydroxyphenylpropane having a methoxy group, represented by the formula (I) or (II):

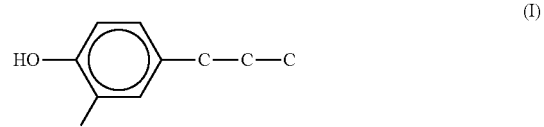

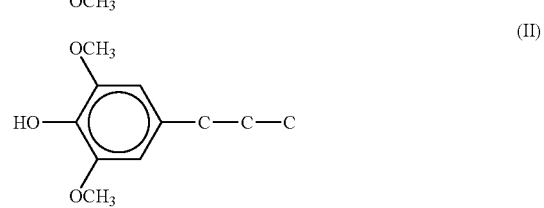

wherein an element or substituent bound to the carbon atom is, independently —H, —OH, —SO₃H or =O or the like, and wherein —C—C— and/or —C—C may be an unsaturated bond, as basic backbones.

The lignin compound used in the present invention refers to a compound obtained from a lignocellulosic compound as a raw material, the compound being in the form of a residue after removing cellulose from the lignocellulosic compound. It is not necessary that the cellulose is completely removed from the lignocellulosic compound. In the lignin compound as described above, since the forms of the lignin vary depending upon the methods of removing cellulose and the methods of collecting residues, and the like, the components derived from lignin contained in the lignin compound would differ, but the lignin compound has the lignin basic backbone as mentioned above. Therefore, the lignin compound is a compound containing lignin or components derived from lignin. The lignocellulosic compound containing lignin includes wood compounds from wood flour, wood chip, sawdust, lumber waste, scrap lumber, and bark; and various plant compounds such as barley straw, bagasse, rice straw, rice hull, and beet pulp. In addition, paper such as waste paper, pulp or the like can be used.

The lignin compound used in the present invention includes, for example, lignin compounds such as lignin derivatives, lignophenolic derivatives, lignocellulosic degradation products, and the like, without being particularly limited thereto.

The lignin derivative is a digested lignin obtained by digestion of a lignocellulosic compound, and the digested lignin includes "kraft lignin," "ligninsulfonic acid," "digested lignin according to a sodium method," "digested lignin according to a sulfite method," "acetic acid-digested lignin," "steam-exploded lignin," "organosolv lignin," and the like, according to the kinds of the digestion liquids.

The "kraft lignin" is obtained by digesting a lignocellulosic compound at a high temperature with an aqueous mixed solution of sodium hydroxide and sodium sulfate as a digestion solution. The "ligninsulfonic acid" is obtained by digesting a lignocellulosic compound at a high temperature with a neutral or weakly basic sulfite solution. The "digested lignin according to a sodium method" is obtained by digesting a lignocellulosic compound at a high temperature with an aqueous sodium hydroxide solution as a digestion solution. The "digested lignin according to a sulfite method" is obtained by digesting a lignocellulosic compound at a high temperature with a sulfite solution as a digestion solution. The "acetic acid-digested lignin" is obtained by high-temperature steam-digesting a lignocellulosic compound with acetic acid and hydrochloric acid. The "steam-exploded lignin" is obtained by treating with a high-pressure saturated steam, and instantly liberating the pressure. In addition, the "organosols lignin" is obtained by digesting with an organic solvent such as an alcohol, ethyl acetate, a low-molecular weight organic acid primarily acetic acid, a phenol, or ethanolamine.

The lignophenolic derivative is obtained from a phenolic derivative phase (organic phase) of a phase separation system composed of a phenolic derivative phase and a concentrated acid phase (aqueous phase), obtained by adding a phenolic derivative to a lignocellulosic compound containing lignin, and thereafter adding a concentrated acid thereto. By treating the lignocellulosic compound with a phenolic derivative, the lignin in the lignocellulosic compound is extracted as a lignophenolic derivative. The method for producing a lignophenolic derivative as described above is disclosed in Japanese Patent Laid-Open Nos. Hei-9-278904 and 2001-131201, and the like.

The phenolic derivative which is a raw material for production of a lignophenolic derivative includes monohydric phenols such as phenol, cresol, alkylphenols, methoxyphenol, and naphthol; dihydric phenols such as catechol, resorcin, and hydroquinone; trihydric phenols such as pyrogallol; and the like. In addition, the concentrated acid used in the extraction of a water-soluble substance includes, for example, sulfuric acid having a concentration of 65% by weight or more, phosphoric acid having a concentration of 85% by weight or more, hydrochloric acid having a concentration of 38% by weight or more, p-toluenesulfonic acid, trifluoroacetic acid, trichloroacetic acid, formic acid, and the like.

The lignocellulosic degradation product refers to a product obtained by subjecting a lignocellulosic compound containing lignin to a degradation treatment with a phenolic compound, a polyhydric alcohol, a cyclic ester or the like, in the presence of an acid catalyst or an alkali catalyst. Alternatively, the lignocellulosic degradation product is obtained by subjecting a lignocellulosic compound to a degradation treatment with a compound such as a hydroxycarboxylic acid, a dicarboxylic acid, an amino alcohol, or the like. Methods for producing the lignocellulosic degradation products are disclosed in Japanese Patent Laid-Open Nos. Hei-4-106128, 2000-325921, 2001-354774, and the like.

The acid catalyst to be used in the degradation treatment includes sulfuric acid, hydrochloric acid, toluenesulfonic acid, phenolsulfonic acid, aluminum chloride, zinc chloride, boron trifluoride, and the like. The alkali catalyst includes metal hydroxides such as sodium hydroxide, potassium hydroxide, and calcium hydroxide; metal carbonates such as calcium carbonate; amines such as ammonia and monoethanolamine; and the like.

The lignin compound as mentioned above is a polymeric compound having a functional group such as a phenolic or alcoholic hydroxyl group, or a carboxy group in the molecule, and can be used in the polycondensation reaction.

In the phenolic hydroxyl group, a methoxy group is bound to a carbon atom adjoining a carbon bound to the phenolic hydroxyl group, so that it is deduced that the phenolic hydroxyl group has a higher reactivity than an ordinary functional group.

Among them, a preferred lignin compound is a digested lignin obtained by digesting the lignocellulosic compound mentioned above, and commercially available products of lignin include, for example, Lignosuper A (manufactured by KONO NEW MATERIAL DEVELOPMENT CO., LTD.: a digested lignin according to a sodium method), Lignosuper D (manufactured by KONO NEW MATERIAL DEVELOPMENT CO., LTD.: ligninsulfonic acid), VANILLEX RN, HW, N, 2000N (manufactured by NIPPON PAPER CHEMICALS CO., LTD.: ligninsulfonic acid), PEARLLEX NP, DP (manufactured by NIPPON PAPER CHEMICALS CO., LTD.: ligninsulfonic acid), SAN-X P252 (manufactured by NIPPON PAPER CHEMICALS CO., LTD.: ligninsulfonic acid), VANIOL NDP, ODP (manufactured by NIPPON PAPER CHEMICALS CO., LTD.: modified ligninsulfonic acid), and the like.

The lignin compound has a weight-average molecular weight of preferably from 1,000 to 500,000, more preferably from 2,000 to 200,000, and even more preferably from 3,000 to 100,000, from the viewpoint of improving durability of the toner caused by an increase in molecular weight.

On the other hand, the lignin compound has a weight-average molecular weight of preferably from 300 to 500,000, more preferably from 300 to 200,000, even more preferably from 300 to 100,000, still even more preferably from 300 to 50,000, and still even more preferably from 500 to 50,000, from the viewpoint of not only improving durability of the toner caused by an increase in molecular weight, but also improving dispersibility of the lignin compound in a polyester produced by polycondensing an alcohol component and a carboxylic acid compound, thereby stabilizing triboelectric chargeability of the toner.

The weight-average molecular weight of the lignin compound can be properly adjusted by adjusting conditions for digestion (temperature, time), and the like. In addition, a low-molecular compound can be extracted from the lignin compound obtained by digestion with an organic solvent such as an alcohol.

It is preferable that the alcohol component used in the present invention contains an alkylene oxide adduct of bisphenol A and/or an aliphatic diol.

The alkylene oxide adduct of bisphenol A is preferred, from the viewpoint of storage property of the toner.

It is preferable that the alkylene oxide adduct of bisphenol A is a compound represented by the formula (III):

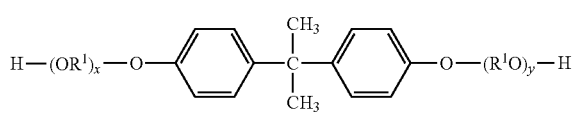

(III)

wherein $R^1O$ and $OR^1$ are an oxyalkylene group, wherein $R^1$ is an ethylene group and/or a propylene group; and each of x and y is a positive number showing an average number of moles of alkylene oxide added, wherein an average number of the sum of x and y is preferably from 1 to 16, more preferably from 1 to 8, and even more preferably from 1.5 to 4. Specific examples of the alkylene oxide adduct of bisphenol A represented by the formula (III) include an alkylene oxide adduct of bisphenol A such as a polyoxypropylene adduct of 2,2-bis (4-hydroxyphenyl)propane and a polyoxyethylene adduct of 2,2-bis(4-hydroxyphenyl)propane; and the like.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

It is preferable that the aliphatic diol is an aliphatic diol having preferably 2 to 8 carbons atoms, and more preferably 2 to 6 carbons atoms, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, the aliphatic diols having a hydroxyl group bound to a secondary carbon atom are preferred, from the viewpoint of being excellent in low-temperature fixing ability and storage stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

As other alcohols, a trihydric or higher polyhydric alcohol such as glycerol, pentaerythritol, or trimethylolpropane may be used.

As a carboxylic acid component, an aromatic dicarboxylic acid compound and/or an aliphatic dicarboxylic acid compound is preferred. In the present invention, carboxylic acids and derivatives such as acid anhydrides and alkyl(1 to 3 carbon atoms) esters are collectively referred to as the carboxylic acid compound.

An aromatic dicarboxylic acid compound such as phthalic acid, isophthalic acid, or terephthalic acid is preferred, from the viewpoint of a balance among low-temperature fixing ability, storage property and initial rise in triboelectric charging of the toner.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

The aliphatic dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid, and n-dodecenylsuccinic acid; anhydrides and alkyl(1 to 3 carbon atoms) esters of these acids; and the like. Among them, the dicarboxylic acid compound having preferably 2 to 10 carbon atoms, and more preferably 2 to 8 carbon atoms is preferred, and a fumaric acid compound is more preferred, from the viewpoint of low-temperature fixing ability and storage property of the toner. Here, the aliphatic dicarboxylic acid compound, as mentioned above, refers to aliphatic dicarboxylic acids, anhydrides thereof, and alkyl(1 to 3 carbon atoms) esters thereof, among which aliphatic dicarboxylic acids are preferred.

The aliphatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability of the toner.

Other carboxylic acid compounds include alicyclic dicarboxylic acids such as cyclohexanedicarboxylic acid; tricarboxylic or higher polycarboxylic acids such as trimellitic acid and pyromellitic acid; rosins; rosins modified with fumaric acid, maleic acid, or acrylic acid; and the like.

In the present invention, it is desirable that the carboxylic acid component contains a tricarboxylic or higher polycarboxylic acid compound, preferably a trimellitic acid compound, and more preferably trimellitic anhydride, from the viewpoint of elevating molecular weight and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjustment of molecular weight and improvement in offset resistance.

The resin binder of the present invention is obtained by polycondensing a carboxylic acid component and an alcohol component in the presence of the above-mentioned lignin compound.

The lignin compound is used in an amount of preferably from 5 to 200 parts by weight, more preferably from 5 to 100 parts by weight, even more preferably from 10 to 100 parts by weight, still even more preferably from 10 to 80 parts by weight, and still even more preferably from 15 to 40 parts by weight, based on 100 parts by weight of a total amount of the carboxylic acid component and the alcohol component, from the viewpoint of low-temperature fixing ability, storage property and durability of the toner.

In addition, the lignin compound is used based on the alcohol component in an amount of preferably from 2 to 200 parts by weight, more preferably from 5 to 150 parts by weight, even more preferably from 10 to 130 parts by weight, still even more preferably from 20 to 120 parts by weight, and still even more preferably from 30 to 120 parts by weight, based on 100 parts by weight of the alcohol component, from the viewpoint of low-temperature fixing ability, storage property and durability of the toner.

The lignin compound may be present in a reaction system at the beginning of a polycondensation reaction, or the lignin compound may be added to a reaction system during the course of the reaction. For example, an alcohol component and a carboxylic acid component are polycondensed, and thereafter a lignin compound is added to a reaction mixture to further carry out a polycondensation reaction, or alternatively, an alcohol component and a carboxylic acid component are polycondensed, and thereafter a lignin compound and a trihydric or higher polyhydric alcohol and/or a tricarboxylic or higher polycarboxylic acid compound is added to a reaction mixture to further carry out a polycondensation reaction.

Since a lignin compound has a high dispersibility in an alcohol component, it is preferable that a mixture of a lignin compound and an alcohol component (specifically a mixed dispersion) and a carboxylic acid component are polycondensed, from the viewpoint of durability of the toner. More preferably, it is preferable that a carboxylic acid component is added to a mixture of a lignin compound and an alcohol component to be polycondensed, from the viewpoint of reactivity, handling property, and durability of the toner.

The lignin compound and at least a part of the alcohol component may be mixed, and the lignin compound and the alcohol component before the addition of the carboxylic acid component are in a mixing weight ratio, i.e. the lignin compound/alcohol component, of preferably from 2/100 to 10/1, more preferably from 5/100 to 3/1, even more preferably from 10/100 to 2/1, and still even more preferably from 20/100 to 1/1.

The temperature at which the lignin compound and the alcohol component are mixed is preferably from 20° to 150° C., and more preferably from 50° to 140° C., from the viewpoint of dispersibility of the lignin compound. Upon mixing, it is preferable to stir the components. In stirring, a generally used mixing agitator apparatus such as anchor blades can be used. The temperature at which the carboxylic acid component is mixed with the mixture is also preferably from 20° to 150° C., and more preferably from 50° to 140° C.

The molar ratio of the carboxylic acid component to the alcohol component, i.e. the carboxylic acid component/the alcohol component, is preferably from 0.5 to 1.3, and more preferably from 0.6 to 1.1, from the viewpoint of low-temperature fixing ability, storage property, and durability of the toner.

It is preferable that the polycondensation reaction is carried out at a temperature of preferably from 160° to 250° C., and more preferably from 200° to 250° C., in an inert gas atmosphere in the presence of an esterification catalyst such as a tin compound or a titanium compound.

As the tin compound, for example, dibutyltin oxide is known; however, in the present invention, tin(II) compounds without containing a Sn—C bond are preferred from the viewpoint of providing excellent dispersibility in the polyester, thereby stabilizing triboelectric charging of the toner.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable, from the viewpoint of elevating the glass transition temperature of the resin, thereby improving storage property of the toner.

The tin(II) compound having a Sn—O bond includes tin(II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) compound having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) having a Sn—X bond, wherein X is a halogen atom, includes tin(II) halides, such as tin(II) chloride and tin(II) bromide, and the like. Among them, a fatty acid tin(II) represented by $(R^2COO)_2Sn$, wherein $R^2$ is an alkyl group or an alkenyl group having 5 to 19 carbon atoms, an alkoxy tin(II) represented by $(R^3O)_2Sn$, wherein $R^3$ is an alkyl group or alkenyl group having 6 to 20 carbon atoms, and tin(II) oxide represented by SnO are preferable; the fatty acid tin(II) represented by $(R^2COO)_2Sn$ and tin oxide (II) are more preferable; tin(II) octanoate, tin(II) 2-ethylhexanoate, tin(II) stearate, and tin(II) oxide are even more preferable, from the viewpoint of durability of the toner and catalytic ability.

Specific examples of the titanium compound include titanium diisopropylate bis(triethanolaminate) $[Ti(C_6H_{14}O_3N)_2(C_3H_7O)_2]$, titanium diisopropylate bis(diethanolaminate) $[Ti(C_4H_{10}O_2N)_2(C_3H_7O)_2]$, titanium dipentylate bis(triethanolaminate) $[Ti(C_6H_{14}O_3N)_2(C_5H_{11}O)_2]$, titanium diethylate bis(triethanolaminate) $[Ti(C_6H_{14}O_3N)_2(C_2H_5O)_2]$, titanium dihydroxyoctylate bis(triethanolaminate) $[Ti(C_6H_{14}O_3N)_2(OHC_8H_{16}O)_2]$, titanium distearate bis(triethanolaminate) $[Ti(C_6H_{14}O_3N)_2(C_{18}H_{37}O)_2]$, titanium triisopropylate triethanolaminate $[Ti(C_6H_{14}O_3N)(C_3H_7O)_3]$, titanium monopropylate tris(triethanolaminate) $[Ti(C_6H_{14}O_3N)_3(C_3H_7O)]$, and the like. Among them, titanium diisopropylate bis(triethanolaminate), titanium diisopropylate bis(diethanolaminate) and titanium dipentylate bis(triethanolaminate) are preferable, from the viewpoint of suppressing degradability of the catalyst and increasing reactivity of the ester polycondensation, thereby improving durability of the toner. These titanium compounds are available as marketed products, for example, of Matsumoto Trading Co., Ltd.

Specific examples of other preferred titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyl dihydroxyoctyl titanate $[Ti(C_8H_{17}O)_2(OHC_8H_{16}O)_2]$, dimyristyl dioctyl titanate $[Ti(C_{14}H_{29}O)_2(C_8H_{17}O)_2]$, and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component. Here, the amount of the esterification catalyst present means an entire formulation amount of the catalysts used in the polycondensation reaction.

In the present invention, it is preferable that a pyrogallol compound having a benzene ring of which three hydrogen atoms bound to carbon atoms adjacent to each other are substituted by hydroxyl groups is used together with an esterification catalyst, from the viewpoint of increasing reactivity of the aromatic compound used in the present invention and improving storage property of the toner.

The pyrogallol compound includes pyrogallol, pyrogallic acid, pyrogallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (IV):

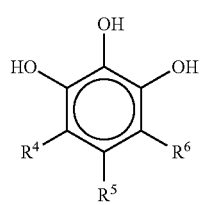

(IV)

wherein each of $R^4$ to $R^6$ is independently a hydrogen atom or —$COOR^7$, wherein $R^7$ is a hydrogen atom or a hydrocarbon group having 1 to 12 carbon atoms, preferably an alkyl group having 1 to 12 carbon atoms or an alkenyl group having 2 to 12 carbon atoms, is preferable, from the viewpoint of durability of the resin obtained. In the formula, the hydrocarbon group of $R^7$ has preferably 1 to 8 carbon atoms, and more preferably 1 to 4 carbon atoms, from the viewpoint of reaction activity. Among the compounds represented by the formula (IV), a compound where each of $R^4$ and $R^6$ is a hydrogen atom, and $R^5$ is a hydrogen atom or —$COOR^7$ is more preferable. Specific examples include pyrogallol ($R^4$ to $R^6$: hydrogen atoms), pyrogallic acid ($R^4$ and $R^6$: hydrogen atoms, $R^5$: —COOH), pyrogallic acid esters, such as ethyl pyrogallate ($R^4$ and $R^6$: hydrogen atoms, $R^5$: —$COOC_2H_5$), propyl pyrogallate ($R^4$ and $R^6$: hydrogen atoms, $R^5$: —$COOC_3H_7$), butyl pyrogallate ($R^4$ and $R^6$: hydrogen atoms, $R^5$: —$COOC_4H_9$), octyl pyrogallate ($R^4$ and $R^6$: hydrogen atoms, $R^5$: —$COOC_8H_{17}$), and lauryl pyrogallate ($R^4$ and $R^6$: hydrogen atoms, $R^5$: —$COOC_{12}H_{25}$), and the like. Pyrogallic acid and the pyrogallic acid esters are preferred from the viewpoint of storage property of the toner.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of a total amount of the alcohol component and the carboxylic acid component subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst to be used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The resin binder of the present invention refers to a resin containing a polyester obtained by polycondensing the alcohol component and the carboxylic acid component, and a lignin compound, and it is considered that the lignin compound is finely dispersed in the polyester, and partly polycondensed with the polyester.

Here, the polyester may contain a polyester modified to an extent that the properties are not substantially impaired.

The modified resins of polyesters include, for instance, polyester-polyamides, urethane-modified polyesters in which a polyester is modified with an urethane bond, epoxy-modified polyesters in which a polyester is modified with an epoxy bond, composite resins having two or more resin components including a polyester component and a vinyl resin component, and the like.

The composite resin containing a polyester component and a vinyl resin component may be produced by any of the methods, including, for example, a method including melt-kneading each of the resins in the presence of an initiator or the like as necessary, a method including dissolving each of the resins in a solvent, and mixing the solutions, and a method including polymerizing a mixture of raw material monomers of each of the resins. The composite resin is preferably a resin obtained by a polycondensation reaction and an addition polymerization reaction using the raw material monomers of the polyester component and the raw material monomers of the vinyl resin component mentioned above (JP-A-Hei-7-98518). Specifically, it is preferable that the composite resin is a hybrid resin obtained by further using, in addition to the raw materials monomers of a polycondensation resin and the raw material monomers of an addition polymerization resin, a compound capable of reacting with both of the raw material monomers of a polycondensation resin and the raw material monomers of an addition polymerization resin (dually reactive monomer), i.e. a resin in which a polycondensation resin and an addition polymerization resin are partially bonded via a dually reactive monomer. It is preferable that the dually reactive monomer is a compound having in its molecule an ethylenically unsaturated bond and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. It is more preferable that the dually reactive monomer is acrylic acid, methacrylic acid, or fumaric acid.

The raw material monomers of a vinyl resin component includes styrenic compounds such as styrene and α-methylstyrene; ethylenically unsaturated monoolefins such as ethylene and propylene; diolefins such as butadiene; vinyl halides such as vinyl chloride; vinyl esters such as vinyl acetate and vinyl propionate; esters of ethylenic monocarboxylic acids such as alkyl(1 to 18 carbon atoms) esters of (meth)acrylic acid and dimethylaminoethyl(meth)acrylate;

vinyl ethers such as vinyl methyl ether; vinylidene halides such as vinylidene chloride; N-vinyl compounds such as N-vinylpyrrolidone; and the like. Styrene, butyl acrylate, 2-ethylhexyl acrylate, and methyl methacrylate are preferable, from the viewpoint of reactivity, pulverizability and triboelectric stability. Styrene and/or an alkyl ester of (meth) acrylic acid is contained in an amount of preferably 50% by weight or more, and more preferably from 80 to 100% by weight of the vinyl resin component.

When the raw material monomers of a vinyl resin component are polymerized, a polymerization initiator, a crosslinking agent, or the like may be used, as necessary.

The weight ratio of the raw material monomers of a polyester component to the raw material monomers of a vinyl resin component, i.e. the raw material monomers of a polyester component/the raw material monomers of a vinyl resin component, is preferably from 55/45 to 95/5, more preferably from 60/40 to 95/5, and even more preferably from 70/30 to 90/10, from the viewpoint of forming the continuous matrix by the polyester component. Here, a dually reactive monomer is regarded as a raw material monomer of the polyester component.

The resin binder of the present invention has a softening point of preferably from 90° to 160° C., more preferably from 100° to 150° C., and even more preferably from 105° to 145° C., from the viewpoint of fixing ability, storage property and durability of the toner.

It is preferable to use the resin binder of the present invention as both a resin having a higher softening point (a high-softening point resin) and a resin having a lower softening point (a low-softening point resin), in other words, it is preferable to use the lignin compound in the resin having a higher softening point and the resin having a lower softening point, from the viewpoint of low-temperature fixing ability, storage property and durability of the toner, and it is preferable that the lignin compound is used at least in a high-softening point resin, from the viewpoint of durability.

The high-softening point resin and the low-softening point resin have softening points, the difference of which is preferably 10° C. or more, more preferably from 10° to 70° C., and even more preferably from 20° to 60° C.

The high-softening point resin has a softening point of preferably from exceeding 125° to 160° C., and more preferably from 130° to 150° C., and the low-softening point resin has a softening point of preferably 90° C. or higher and lower than 125° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1.

The glass transition temperature is preferably from 45° to 85° C., and more preferably from 50° to 80° C., from the viewpoint of fixing ability, storage property and durability of the toner.

From the viewpoint of initial rise in triboelectric charging, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

By using the resin binder of the present invention, a toner for electrophotography having excellent durability, while maintaining low-temperature fixing ability and storage property of the toner, is obtained.

In the toner of the present invention, a known resin binder, for example, a resin including a vinyl resin such as styrene-acrylic resin, and other resins such as an epoxy resin, a polycarbonate, or a polyurethane may be used together within the range that would not impair the effects of the present invention. The polyester resin of the present invention is contained in an amount of preferably 70% by weight or more, more preferably 80% by weight or more, even more preferably 90% by weight or more, and even more preferably substantially 100% by weight, of the resin binder.

The toner of the present invention may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used, and carbon black, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, or the like can be used. The toner of the present invention may be any of black toner and color toner. The colorant is contained in an amount of preferably from 1 to 40 parts by weight, and more preferably from 2 to 10 parts by weight, based on 100 parts by weight of the resin binder.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The charge control agent is not particularly limited, and the charge control agent may contain any one of positively chargeable and negatively chargeable charge control agents.

The positively chargeable charge control agent includes Nigrosine dyes, for example, "Nigrosine Base EX," "Oil Black BS," "Oil Black SO," "BONTRON N-01," "BONTRON N-04," "BONTRON N-07," "BONTRON N-09," "BONTRON N-11" (hereinabove manufactured by Orient Chemical Co., Ltd.), and the like; triphenylmethane-based dyes containing a tertiary amine as a side chain; quaternary ammonium salt compounds, for example, "BONTRON P-51" (manufactured by Orient Chemical Co., Ltd.), cetyltrimethylammonium bromide, "COPY CHARGE PX VP435" (manufactured by Hoechst), and the like; polyamine resins, for example, "AFP-B" (manufactured by Orient Chemical Co., Ltd.), and the like; imidazole derivatives, for example, "PLZ-2001," "PLZ-8001" (hereinabove manufactured by SHIKOKU CHEMICAL CORPORATION), and the like.

In addition, the negatively chargeable charge control agent includes metal-containing azo dyes, for example, "VARIFAST BLACK 3804," "BONTRON S-31" (hereinabove manufactured by Orient Chemical Co., Ltd.), "T-77" (manufactured by Hodogaya Chemical Co., Ltd.), "BONTRON S-32," "BONTRON S-34," "BONTRON S-36," (hereinabove manufactured by Orient Chemical Co., Ltd.), "AIZEN SPILON BLACK TRH" (manufactured by Hodogaya Chemical Co., Ltd.), and the like; metal compounds of benzilic acid compounds, for example, "LR-147," "LR-297" (hereinabove manufactured by Japan Carlit, Ltd.), and the like; metal compounds of salicylic acid compounds, for example, "BONTRON E-81," "BONTRON E-84," "BONTRON E-88," "E-304" (hereinabove manufactured by Orient Chemical Co., Ltd.), and the like; "TN-105" (manufactured by Hodogaya Chemical Co., Ltd.); copper phthalocyanine dyes; quaternary ammonium salts, for example, "COPY CHARGE NX VP434" (manufactured by Hoechst), and the like; nitroimidazole derivatives; organometallic compounds, for example, "TN-105" (manufactured by Hodogaya Chemical Co., Ltd.); and the like.

The charge control agent is contained in an amount of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of initial rise in triboelectric charging of the toner.

In the present invention, it is preferable that a charge control resin is contained in order to improve triboelectric chargeability. The charge control resin is preferably a styrenic resin. A quaternary ammonium salt group-containing styrenic resin is preferred, from the viewpoint of exhibiting positive chargeability of the toner, and a sulfonic acid group-containing styrenic resin is preferred, from the viewpoint of exhibiting negative chargeability of the toner.

The quaternary ammonium salt group-containing styrenic resin is more preferably a quaternary ammonium salt group-containing styrene-acrylic resin obtained by the polymerization of a monomer mixture containing a monomer represented by the formula (Va):

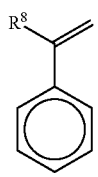

(Va)

wherein $R^8$ is a hydrogen atom or a methyl group;
a monomer represented by the formula (Vb):

(Vb)

wherein $R^9$ is a hydrogen atom or a methyl group, and $R^{10}$ is an alkyl group having 1 to 12 carbon atoms; and
a monomer represented by the formula (Vc):

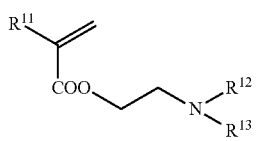

(Vc)

wherein $R^{11}$ is a hydrogen atom or a methyl group, and each of $R^{12}$ and $R^{13}$ is an alkyl group having 1 to 4 carbon atoms,
or a quaternary compound thereof. The monomers may be previously subjected to formation of quaternary compounds, or the formation of quaternary compounds may be carried out after the polymerization. A quaternary compound-forming agent includes alkyl halides such as methyl chloride and methyl iodide, diethyl sulfate, di-n-propyl sulfate, and the like.

The monomer represented by the formula (Va) is preferably a styrene in which $R^8$ is a hydrogen atom, and the monomer represented by the formula (Vb) is a monomer in which $R^9$ is preferably a hydrogen atom and $R^{10}$ is an alkyl group having preferably from 1 to 6 carbon atoms, and more preferably from 1 to 4 carbon atoms. Specific examples of the monomer represented by the formula (Vb) include butyl acrylate, 2-ethylhexyl acrylate, and the like. The monomer represented by the formula (Vc) is preferably a monomer in which $R^{11}$ is a methyl group, and $R^{12}$ and $R^{13}$ are a methyl group or an ethyl group, and the monomer is more preferably dimethylaminoethyl methacrylate in which $R^{11}$, $R^{12}$ and $R^{13}$ are a methyl group, each being desirable.

In the quaternary ammonium salt group-containing styrenic resin, it is desirable that the monomer represented by the formula (Va) is contained in an amount of preferably from 60 to 97% by weight, and more preferably from 70 to 90% by weight, of the monomer mixture, that the monomer represented by the formula (Vb) is contained in an amount of preferably from 1 to 33% by weight, and more preferably from 5 to 20% by weight, of the monomer mixture, and that the monomer represented by the formula (Vc) or a quaternary compound thereof is contained in an amount of preferably from 2 to 35% by weight, and more preferably from 5 to 20% by weight, of the monomer mixture.

Specific examples of the quaternary ammonium salt group-containing styrenic resin obtained from the monomers represented by the formulae (Va) to (Vc) include butyl acrylate/N,N-diethyl-N-methyl-2-(methacryloyloxy)ethyl ammonium/styrene copolymers, and the like.

It is preferable that the sulfonic acid group-containing styrenic resin is a sulfonic acid group-containing styrenic resin obtained by polymerizing a monomer mixture containing a monomer represented by the formula (Va), a monomer represented by the formula (Vb), as mentioned above, and a sulfonic acid group-containing monomer.

The sulfonic acid group-containing monomer includes (meth)allylsulfonic acid, 2-(meth)acrylamide-2-methylpropanesulfonic acid, and styrenesulfonic acid. Specific examples of the sulfonic acid group-containing monomer include 2-ethylhexyl acrylate/2-acrylamide-2-methyl-1-propanesulfonic acid/styrene copolymers, and the like.

In the sulfonic acid group-containing styrenic resin, it is desirable that the monomer represented by the formula (Va) is contained in an amount of preferably from 60 to 97% by weight, and more preferably from 70 to 90% by weight, that the monomer represented by the formula (Vb) is contained in an amount of preferably from 1 to 33% by weight, and more preferably from 5 to 20% by weight, and that the sulfonic acid group-containing monomer is contained in an amount of preferably from 2 to 35% by weight, and more preferably from 5 to 20% by weight, of the monomer mixture.

In both of the quaternary ammonium salt group-containing styrenic resin and the sulfonic acid group-containing styrenic resin, the polymerization of the monomer mixture can be carried out by, for example, heating a monomer mixture to 50° to 100° C. in an inert gas atmosphere in the presence of a polymerization initiator such as azobisdimethylvaleronitrile. Here, the polymerization method may be any of solution polymerization, suspension polymerization, or bulk polymerization, and preferably solution polymerization.

The styrenic resin has a softening point of preferably from 100° to 140° C., and more preferably from 110° to 130° C., from the viewpoint of low-temperature fixing ability of the toner.

The styrenic resin contained as a charge control resin is used in an amount of preferably from 3 to 40 parts by weight, more preferably from 4 to 30 parts by weight, and even more preferably from 5 to 20 parts by weight, based on 100 parts by weight of the resin binder, from the viewpoint of exhibiting triboelectric chargeability of the toner.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. In the case of a pulverized toner produced by a melt-kneading method, for example, a toner can be produced by homogeneously mixing raw materials such as a resin binder, a colorant, and a charge control agent, with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size.

The toner of the present invention has a volume-median particle size ($D_{50}$) preferably from 3 to 15 µm, and more preferably from 3 to 10 µm. Here, the volume-median particle size ($D_{50}$) as used herein means a particle size at 50% counting from smaller particle sizes in a cumulative volume frequency calculated in volume percentage.

In the toner of the present invention, it is preferable that fine inorganic particles are used as an external additive for improving transferability. Specific examples preferably include one or more members selected from the group consisting of silica, alumina, titania, zirconia, tin oxide, and zinc oxide. Among them, silica is preferred, and it is more preferable to contain a silica having a small specific gravity, from the viewpoint of preventing embedment.

The silica is preferably a hydrophobic silica that is hydrophobically treated, from the viewpoint of transferability of the toner.

It is preferable that the method of subjecting silica to a hydrophobic treatment includes the step of modifying of a silanol group on the surface of the silica particles preferably with a hydrophobic group such as an alkylsilyl group having 1 to 12 carbon atoms, for example, a methylsilyl group, a hexylsilyl group, or the like, or coating the surface with a hydrophobic resin.

The hydrophobically treating agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, hexamethyldisilazane is preferred.

The external additive has an average particle size of preferably from 10 to 250 nm, more preferably from 10 to 200 nm, and even more preferably from 15 to 90 nm, from the viewpoint of triboelectric chargeability, fluidity, and transferability of the toner.

The external additive is contained in an amount of from 0.05 to 5 parts by weight, preferably from 0.1 to 3 parts by weight, and more preferably from 0.3 to 3 parts by weight, based on 100 parts by weight of the toner particles before the treatment with the external additive.

The toner of the present invention can be used as a toner for monocomponent development, or a two-component developer prepared by mixing the toner with a carrier.

EXAMPLES

The present invention will be specifically described hereinbelow by the Examples, without intending to limit the scope of the present invention thereto.

[Weight-Average Molecular Weight (Mw) of Lignin Compound]

The weight-average molecular weight is obtained by measuring a molecular weight distribution in accordance with a gel permeation chromatography (GPC) in the following manner.

<Preparation of Sample Solution>

Twenty milligrams of a lignin compound is dissolved in 10 ml of DMF (N,N-dimethylformamide). Next, this solution is filtered with a fluororesin filter (manufactured by Sumitomo Electric Industries, Ltd., FP-200) having a pore size of 2 µm, to remove insoluble components, to provide a sample solution.

<Measurement Conditions>

Using a measurement apparatus and an analyzing column mentioned below, an eluent N,N-dimethylformamide supplemented with 60 mmol/L $H_3PO_4$ and 50 mmol/L LiBr is allowed to flow at a flow rate of 1 ml per minute, and the column is stabilized in a thermostat at 40° C. Thereinto 100 µl of a sample solution was poured to carry out measurements. The molecular weight of the sample is calculated on the basis of a previously drawn calibration curve. The calibration curve at this time is drawn from several kinds of monodisperse polystyrenes (manufactured by Tosoh Corporation, A-500 ($5.0 \times 10^2$), F-10($9.64 \times 10^4$), F-850($8.42 \times 10^6$), manufactured by Pressure Chemical ($4.0 \times 10^3$, $3.0 \times 10^4$, $9.29 \times 10^5$)) as standard samples.

Measurement Apparatus: HLC-8120GPC (manufactured by Tosoh Corporation)

Analyzing Column: α-M+α-M (manufactured by Tosoh Corporation)

[Softening Point of Resins]

The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample at a heating rate of 6° C./min.

[Glass Transition Temperature of Resins]

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (manufactured by Seiko Instruments, Inc., "DSC 210") of a sample of which temperature is heated at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Acid Value of Resins]

The acid value is measured as prescribed by a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Value of Resins]

The hydroxyl value is measured as prescribed by a method of JIS K0070.

[Melting Point of Releasing Agent]

A temperature of maximum endothermic peak obtained by raising the temperature of a sample at a rate of 10° C./min., the sample prepared by raising the temperature of a sample to 200° C. using a differential scanning calorimeter (manufactured by Seiko Instruments, Inc., "DSC 210"), and cooling the heated sample from that temperature to 0° C. at a cooling rate of 10° C./min., is referred to as a melting point.

[Average Particle Size of External Additive]

The average particle size refers to a number-average particle size, which is an average of particle sizes of 500 particles of the external additive, measured from a photograph taken with a scanning electron microscope (SEM). In a case where the particles have length and breath, it refers to the length.

[Volume-Median Particle Size ($D_{50}$) of Toner]

Measuring Apparatus Coulter Multisizer II (manufactured by Beckman Coulter)

Aperture Diameter: 50 μm

Analyzing Software: Coulter Multisizer AccuComp Ver. 1.19 (manufactured by Beckman Coulter)

Electrolytic Solution: Isotone II (manufactured by Beckman Coulter)

Dispersion: A 5% electrolytic solution of EMULGEN 109P (manufactured by Kao Corporation, polyoxyethylene lauryl ether, HLB: 13.6).

Dispersion Conditions Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.

Measurement Conditions To a beaker are added 100 ml of the above-mentioned electrolytic solution and the dispersion, and 30,000 particles are measured at a concentration at which particle sizes of 30,000 particles can be measured in 20 seconds, and a volume-median particle size ($D_{50}$) is obtained from the particle size distribution.

Production Example 1 of Resins [Resins A1 to A8 and A15]

In a 5-liter four-neck flask equipped with a nitrogen inlet tube, a dehydration tube equipped with a fractional distillation tube through which hot water at 100° C. was allowed to flow, a stirrer, and a thermocouple, an alcohol component and a lignin compound as listed in Table 1 or 2 were mixed while stirring, and the lignin compound was dispersed at 120° C. for 1 hour. Thereafter, terephthalic acid and an esterification catalyst were supplied thereto at the same temperature, and the mixture was heated in a nitrogen atmosphere, and kept at 180° C. for 1 hour. The mixture was then heated from 180° to 230° C. at a rate of 10° C./hr, and then subjected to a polycondensation reaction at 230° C. for 10 hours. Further, trimellitic anhydride as listed in Table 1 or 2 was added thereto, and the mixture was subjected to a reaction at 200° C., and subjected to a reaction at 10 kPa until a softening point as listed in Table 1 or 2 was reached, to provide each of polyesters.

Production Example 2 of Resins [Resins A9 and A10]

In a 5-liter four-neck flask equipped with a dehydration tube equipped with a nitrogen inlet tube, a stirrer, and a thermocouple an alcohol component and a lignin compound as listed in Table 2 were mixed while stirring, and the lignin compound was dispersed at 120° C. for 1 hour. Thereafter, terephthalic acid and an esterification catalyst were supplied thereto at the same temperature, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 2 was added thereto, and the mixture was subjected to a reaction at 200° C., and subjected to a reaction at 10 kPa until a softening point as listed in Table 2 was reached, to provide each of polyesters.

Production Example 3 of Resins [Resins A11 and A12]

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride, and an esterification catalyst, as listed in Table 2, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, trimellitic anhydride as listed in Table 2 was added thereto, and the mixture was subjected to a reaction at 200° C., and subjected to a reaction at 10 kPa until a softening point as listed in Table 2 was reached, to provide each of polyesters.

Production Example 4 of Resin [Resin A13]

A 5-liter four-neck flask equipped with a dehydration tube equipped with a nitrogen inlet tube, a stirrer, and a thermocouple was charged with raw material monomers other than trimellitic anhydride, and an esterification catalyst, as listed in Table 2, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 2 was added thereto, and the mixture was subjected to a reaction at 200° C., and subjected to a reaction at 10 kPa until a softening point as listed in Table 2 was reached, to provide each of polyesters.

Production Example 5 of Resin [Resin H1]

In a 5-liter four-neck flask equipped with a nitrogen inlet tube, a dehydration tube equipped with a fractional distillation tube through which hot water at 100° C. was allowed to flow, a stirrer, and a thermocouple, an alcohol component and a lignin compound as listed in Table 3 were mixed while stirring, and the lignin compound was dispersed at 120° C. for 1 hour. Thereafter, raw material monomers of a polyester other than trimellitic anhydride, and an esterification catalyst were supplied thereto at the same temperature, and the mixture was heated to 160° C. in a nitrogen atmosphere. Thereafter, a mixture of a dually reactive monomer (acrylic acid), raw material monomers of a styrenic resin and a polymerization initiator as listed in the table was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Thereafter, trimellitic anhydride as listed in Table 3 was added thereto, and the mixture was subjected to a reaction at 200° C. and 10 kPa until a softening point as listed in Table 3 was reached, to provide a hybrid resin.

Production Example 6 of Resin [Resin H2]

In a 5-liter four-neck flask equipped with a dehydration tube equipped with a nitrogen inlet tube, a stirrer, and a thermocouple, an alcohol component and a lignin compound as listed in Table 3 were mixed while stirring, and the lignin compound was dispersed at 120° C. for 1 hour. Thereafter, raw material monomers of a polyester other than trimellitic anhydride, and an esterification catalyst were supplied thereto at the same temperature, and the mixture was heated to 160° C. in a nitrogen atmosphere. Thereafter, a mixture of a dually reactive monomer (acrylic acid), raw material monomers of a styrenic resin and a polymerization initiator as listed in the table was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Thereafter, trimellitic anhydride as listed in Table 3 was added thereto, and the mixture was subjected to a reaction at 200° C. and 10 kPa until a softening point as listed in Table 3 was reached, to provide a hybrid resin.

Production Example 7 of Resin [Resin A14]

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers other than trimellitic anhydride and a lignin compound, as listed in Table 2, and the mixture was heated in a nitrogen atmosphere, kept at 180° C. for 1 hour, and heated from 180° to 230° C. at a rate of 10° C./hr. Thereafter, the mixture was subjected to a polycondensation reaction at 230° C. for 10 hours. The mixture was then cooled to 180° C., a lignin compound as listed in Table 2 was supplied thereto, and the mixture was stirred at 180° C. for 1 hour. Thereafter, trimellitic anhydride as listed in Table 2 was added thereto, and the mixture was heated to 200° C., and subjected to a reaction at 200° C. for 1 hour at a normal pressure, and then subjected to a reaction at 10 kPa until a softening point as listed in Table 2 was reached, to provide a polyester.

TABLE 1

| | Resin A1 Amount Used | | | Resin A2 Amount Used | | | Resin A3 Amount Used | | | Resin A4 Amount Used | | |
|---|---|---|---|---|---|---|---|---|---|---|---|---|
| | g | mol | ratio | g | mol | ratio | g | mol | ratio | g | mol | ratio |
| Raw Material Monomers of Polyester Alcohol Component | | molar ratio | | | molar ratio | | | molar ratio | | | molar ratio | |
| 1,2-Propanediol | 570 | 7.5 | 50 | 570 | 7.5 | 50 | 570 | 7.5 | 50 | 570 | 7.5 | 50 |
| 2,3-Butanediol | 675 | 7.5 | 50 | 675 | 7.5 | 50 | 675 | 7.5 | 50 | 675 | 7.5 | 50 |
| Carboxylic Acid Component | | | | | | | | | | | | |
| Terephthalic Acid | 1743 | 10.5 | 70 | 1743 | 10.5 | 70 | 1743 | 10.5 | 70 | 1743 | 10.5 | 70 |
| Trimellitic Anhydride | 576 | 3 | 20 | 576 | 3 | 20 | 576 | 3 | 20 | 576 | 3 | 20 |
| Esterification Catalyst (including promoter) | | | | | | | | | | | | |
| Tin(II) 2-Ethylhexanoate | 17.8 | — | — | 17.8 | — | — | 17.8 | — | — | 17.8 | — | — |
| Pyrogallic Acid | 1.8 | — | — | 1.8 | — | — | 1.8 | — | — | 1.8 | — | — |
| Titanium Compound[1)] | — | — | — | — | — | — | — | — | — | — | — | — |
| Lignin Compound[2)] | | weight ratio | | | weight ratio | | | weight ratio | | | weight ratio | |
| Lignosuper A | 1069 | — | 30 | — | — | — | — | — | — | — | — | — |
| Lignosuper D | — | — | — | 1069 | — | 30 | — | — | — | — | — | — |
| VANILLEX RN | — | — | — | — | — | — | 1069 | — | 30 | — | — | — |
| PEARLLEX NP | — | — | — | — | — | — | — | — | — | 1069 | — | 30 |
| Softening Point (° C.) | | 140.8 | | | 138.4 | | | 141.2 | | | 140.6 | |
| Glass Transition Temp. (° C.) | | 67.4 | | | 68.1 | | | 67.6 | | | 67.1 | |
| Acid Value (mgKOH/g) | | 29.6 | | | 26.5 | | | 28.1 | | | 27.9 | |
| Hydroxyl Value (mgKOH/g) | | 38.4 | | | 40.6 | | | 37.4 | | | 36.5 | |

| | Resin A5 Amount Used | | | Resin A6 Amount Used | | | Resin A7 Amount Used | | |
|---|---|---|---|---|---|---|---|---|---|
| | g | mol | ratio | g | mol | ratio | g | mol | ratio |
| Raw Material Monomers of Polyester Alcohol Component | | molar ratio | | | molar ratio | | | molar ratio | |
| 1,2-Propanediol | 570 | 7.5 | 50 | 570 | 7.5 | 50 | 570 | 7.5 | 50 |
| 2,3-Butanediol | 675 | 7.5 | 50 | 675 | 7.5 | 50 | 675 | 7.5 | 50 |
| Carboxylic Acid Component | | | | | | | | | |
| Terephthalic Acid | 1743 | 10.5 | 70 | 1743 | 10.5 | 70 | 1743 | 10.5 | 70 |
| Trimellitic Anhydride | 576 | 3 | 20 | 576 | 3 | 20 | 576 | 3 | 20 |
| Esterification Catalyst (including promoter) | | | | | | | | | |
| Tin(II) 2-Ethylhexanoate | 17.8 | — | — | 17.8 | — | — | — | — | — |
| Pyrogallic Acid | 1.8 | — | — | 1.8 | — | — | 1.8 | — | — |
| Titanium Compound[1)] | — | — | — | — | — | — | 17.8 | — | — |
| Lignin Compound[2)] | | weight ratio | | | weight ratio | | | weight ratio | |
| Lignosuper A | 178 | — | 5 | 1782 | — | 50 | 535 | — | 15 |

TABLE 1-continued

|  |  |  |  |  |  |  |  |  |
|---|---|---|---|---|---|---|---|---|
| Lignosuper D | — | — | — | — | — | — | — | — |
| VANILLEX RN | — | — | — | — | — | 535 | — | 15 |
| PEARLLEX NP | — | — | — | — | — | — | — | — |
| Softening Point (° C.) | 138.4 |  | 139.4 |  |  |  | 137.4 |  |
| Glass Transition Temp. (° C.) | 66.4 |  | 68.4 |  |  |  | 67.3 |  |
| Acid Value (mgKOH/g) | 28.4 |  | 29.4 |  |  |  | 27.9 |  |
| Hydroxyl Value (mgKOH/g) | 39.8 |  | 38.2 |  |  |  | 40.2 |  |

[1] Titanium diisopropylate bis(triethanolaminate)

[2] The weight ratio of the lignin compound is expressed as a weight ratio based on 100 parts by weight of the raw material monomers of a polyester.

TABLE 2

|  | Resin A8 Amount Used | | | Resin A9 Amount Used | | | Resin A10 Amount Used | | | Resin A11 Amount Used | | |
|---|---|---|---|---|---|---|---|---|---|---|---|---|
|  | g | mol | ratio | g | mol | ratio | g | mol | ratio | g | mol | ratio |
| Raw Material Monomers of Polyester Alcohol Component |  | | molar ratio |  | | molar ratio |  | | molar ratio |  | | molar ratio |
| 1,2-Propanediol | 570 | 7.5 | 50 | — | — | — | — | — | — | 570 | 7.5 | 50 |
| 2,3-Butanediol | 675 | 7.5 | 50 | — | — | — | — | — | — | 675 | 7.5 | 50 |
| BPA-PO[1] | — | — | — | 1715 | 4.9 | 70 | 1715 | 4.9 | 70 | — | — | — |
| BPA-EO[2] | — | — | — | 683 | 2.1 | 30 | 683 | 2.1 | 30 | — | — | — |
| Carboxylic Acid Component | | | | | | | | | | | | |
| Terephthalic Acid | 1743 | 10.5 | 70 | 813 | 4.9 | 70 | 813 | 4.9 | 70 | 1743 | 10.5 | 70 |
| Trimellitic Anhydride | 288 | 1.5 | 10 | 269 | 1.4 | 20 | 134 | 0.7 | 10 | 576 | 3 | 20 |
| Esterification Catalyst (including prompter) | | | | | | | | | | | | |
| Tin(II) 2-Ethylhexanoate | 21.8 | — | — | 24.9 | — | — | 23.9 | — | — | 23.8 | — | — |
| Pyrogallic Acid | 2.2 | — | — | 2.5 | — | — | 2.4 | — | — | 2.4 | — | — |
| Lignin Compound[3] |  | | weight ratio |  | | weight ratio |  | | weight ratio |  | | weight ratio |
| Lignosuper A | 983 | — | 30 | 1044 | — | 30 | 1004 | — | 30 | — | — | — |
| Lignosuper A Extract | — | — | — | — | — | — | — | — | — | — | — | — |
| Softening Point (° C.) | | 102.3 | | | 138.6 | | | 101.6 | | | 137.4 | |
| Glass Transition Temp. (° C.) | | 60.1 | | | 69.1 | | | 63.1 | | | 66.8 | |
| Acid Value (mgKOH/g) | | 32.5 | | | 26.1 | | | 24.6 | | | 31.6 | |
| Hydroxyl Value (mgKOH/g) | | 45.3 | | | 34.9 | | | 46.1 | | | 40.6 | |
|  | Resin A12 Amount Used | | | Resin A13 Amount Used | | | Resin A14 Amount Used | | | Resin A15 Amount Used | | |
|  | g | mol | ratio | g | mol | ratio | g | mol | ratio | g | mol | ratio |
| Raw Material Monomers of Polyester Alcohol Component |  | | molar ratio |  | | molar ratio |  |  |  |  |  |  |
| 1,2-Propanediol | 570 | 7.5 | 50 | — | — | — | 570 | 7.5 | 50 | 570 | 7.5 | 50 |
| 2,3-Butanediol | 675 | 7.5 | 50 | — | — | — | 675 | 7.5 | 50 | 675 | 7.5 | 50 |
| BPA-PO[1] | — | — | — | 1715 | 4.9 | 70 | — | — | — | — | — | — |
| BPA-EO[2] | — | — | — | 683 | 2.1 | 30 | — | — | — | — | — | — |
| Carboxylic Acid Component | | | | | | | | | | | | |
| Terephthalic Acid | 1743 | 10.5 | 70 | 813 | 4.9 | 70 | 1743 | 10.5 | 70 | 1743 | 10.5 | 70 |
| Trimellitic Anhydride | 288 | 1.5 | 10 | 134 | 0.7 | 20 | 576 | 3 | 20 | 576 | 3 | 20 |
| Esterification Catalyst (including prompter) | | | | | | | | | | | | |
| Tin(II) 2-Ethylhexanoate | 21.8 | — | — | 24.9 | — | — | 17.8 | — | — | 17.8 | — | — |
| Pyrogallic Acid | 2.2 | — | — | 2.5 | — | — | 1.8 | — | — | 1.8 | — | — |
| Lignin Compound[3] |  | | weight ratio |  | | weight ratio |  |  |  |  |  |  |
| Lignosuper A | — | — | — | — | — | — | 1069 | — | 30 | — | — | — |
| Lignosuper A Extract | — | — | — | — | — | — | — | — | — | 1069 | — | 30 |
| Softening Point (° C.) | | 102.3 | | | 136.9 | | | 138.7 | | | 137.4 | |
| Glass Transition Temp. (° C.) | | 60.6 | | | 69.3 | | | 66.8 | | | 67.9 | |
| Acid Value (mgKOH/g) | | 26.4 | | | 24.6 | | | 28.3 | | | 26.8 | |
| Hydroxyl Value (mgKOH/g) | | 48.4 | | | 31 | | | 37.2 | | | 41.3 | |

[1] Polyoxypropylene(2.2)-2,2-bis(4-hydroxyphenyl)propane

[2] Polyoxyethylene(2.0)-2,2-bis(4-hydroxyphenyl)propane

[3] The weight ratio of the lignin compound is expressed as a weight ratio based on 100 parts by weight of the raw material monomers of a polyester.

TABLE 3

| | Resin H1 Amount Used | | | Resin H2 Amount Used | | |
|---|---|---|---|---|---|---|
| | g | mol | ratio | g | mol | ratio |
| Raw Material Monomers of Polyester (P) Alcohol Component | | | molar ratio | | | molar ratio |
| 1,2-Propanediol | 456 | 6 | 50 | — | — | — |
| 2,3-Butanediol | 540 | 6 | 50 | — | — | — |
| BPA-PO[1] | — | — | — | 1225 | 3.5 | 70 |
| BPA-EO[2] | — | — | — | 488 | 1.5 | 30 |
| Carboxylic Acid Component | | | | | | |
| Terephthalic Acid | 1394 | 8.4 | 70 | 581 | 3.5 | 70 |
| Trimellitic Anhydride | 461 | 2.4 | 20 | 192 | 1.0 | 20 |
| Esterification Catalyst (including promoter) | | | | | | |
| Tin(II) 2-Ethylhexanoate | 14.4 | — | — | 12.5 | — | — |
| Pyrogallic Acid | 1.4 | — | — | 1.3 | — | — |
| Dually Reactive Monomer | | | | | | |
| Acrylic Acid | 45 | 0.72 | 6 | 19 | 0.3 | 6 |
| Raw Material Monomers of Vinyl Resin (V) | | | weight ratio | | | weight ratio |
| Styrene | 608 | — | 84 | 526 | — | 84 |
| 2-Ethylhexyl Acrylate | 116 | — | 16 | 100 | — | 16 |
| Polymerization Initiator[3] | | | weight ratio | | | weight ratio |
| Dibutyl Peroxide | 43 | — | 6 | 38 | — | 6 |
| Lignin Compound[4] | | | weight ratio | | | weight ratio |
| Lignosuper A | 869 | — | 30 | 751 | — | 30 |
| Total Weight of P/Total Weight of V (Weight Ratio) | | 4 | | | 4 | |
| Softening Point (° C.) | | 140.6 | | | 139.4 | |
| Glass Transition Temp. (° C.) | | 63.5 | | | 64.3 | |
| Acid Value (mgKOH/g) | | 27.4 | | | 25.8 | |
| Hydroxyl Value (mgKOH/g) | | 36.9 | | | 36.9 | |

[1] Polyoxypropylene(2.2)-2,2-bis(4-hydroxyphenyl)propane
[2] Polyoxyethylene(2.0)-2,2-bis(4-hydroxyphenyl)propane
[3] The weight ratio of the polymerization initiator is expressed as a weight ratio based on 100 parts by weight of the raw material monomers of a vinyl resin.
[4] The weight ratio of the lignin compound is expressed as a weight ratio based on 100 parts by weight of the raw material monomers of a polyester.

[Lignin Compound]
Lignosuper A: manufactured by KONO NEW MATERIAL DEVELOPMENT CO., LTD., Mw: 15,000
Lignosuper D: manufactured by KONO NEW MATERIAL DEVELOPMENT CO., LTD., Mw: 15,000
VANILLEX RN: manufactured by NIPPON PAPER CHEMICALS CO., LTD., Mw: 25,000
PEARLLEX NP: manufactured by NIPPON PAPER CHEMICALS CO., LTD., Mw: 17,000
Lignosuper A Extract: Mw: 900

[Method of Extracting the Above Lignosuper A Extract]

Ten grams of Lignosuper A was added to 100 g of methanol, and the mixture was stirred at 25° C. for 2 hours. This dispersion was filtered (filter paper: ADVANTEC 5C), and the filtrate was subjected to an evaporator to remove methanol therefrom. This Lignosuper A extract had a weight-average molecular weight of 900.

Examples 1 to 22 and Comparative Examples 1 to 3

One hundred parts by weight of resin binders, a colorant, a charge control agent, a releasing agent, a charge control resin, only applicable to Example 19, other additive, only applicable to Comparative Example 3, as listed in Table 4, were mixed with a Henschel mixer, and the mixture obtained was melt-kneaded with a twin-screw extruder. After cooling, the resulting melt-kneaded product was roughly pulverized to a size of about 1 mm with a hammer-mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added an external additive as listed in Table 4, and the mixture was blended with a Henschel mixer, to provide each of the toners The raw materials listed in Table 4 are as follows.

[Colorant]
A: Black pigment "Regal 330R" (manufactured by Cabot Corporation), carbon black
B: Yellow pigment "Paliotol Yellow D1155" (manufactured by BASF), Pigment Yellow 185
C: Magenta pigment "Super Magenta R" (manufactured by DIC Corporation), Pigment Red 122
D: Cyan pigment "Toner Cyan BG" (manufactured by Clariant), Pigment Blue 15:3

[Charge Control Agent]
A: Negatively chargeable charge control agent "BONTRON S-34" (manufactured by Orient Chemical Co. Ltd., azo metal compound)
B: Positively chargeable charge control agent "BONTRON N-04" (manufactured by Orient Chemical Co. Ltd.)

[Releasing Agent]
A: Polypropylene wax "NP-105" (manufactured by MITSUI CHEMICALS, INC.), melting point: 140° C.

[Charge Control Resin]
A: "FCA-701PT" (manufactured by FUJIKURA KASEI CO., LTD.), positively chargeable charge control resin, quaternary ammonium salt group-containing styrene-acrylic copolymer, softening point: 123° C.

[Other Additive]
A: Lignosuper A: (manufactured by KONO NEW MATERIAL DEVELOPMENT CO., LTD.), Mw: 15,000

[External Additive]
A: "Aerosil R-972" (manufactured by Nippon Aerosil Co., Ltd.), average particle size: 16 nm, hydrophobic treatment agent: DMDS
B: Hydrophilic silica "TG-C243" (manufactured by Cabot Corporation), average particle size: 100 nm, hydrophobic treatment agents: OTES+HMDS)

Test Example 1

Low-Temperature Fixing Ability

The resulting toner was loaded on a copy machine "AR-505" (manufactured by Sharp Corporation), of which fixing device was modified so that fixing could be carried out outside the machine, provided that the evaluation of Example 19 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated in accordance with the following evaluation criteria. The results are shown in Table 4. Here, the paper used in the fixing test was Copy-Bond SF-70NA (75 g/m²), manufactured by Sharp Corporation.

[Evaluation Criteria]
A: Lowest fixing temperature is lower than 150° C.
B: Lowest fixing temperature is 150° C. or higher and lower than 170° C.
C: Lowest fixing temperature is 170° C. or higher.

Test Example 2

Storage Property

Four grams of a toner was allowed to stand for 72 hours under environmental conditions of a temperature of 55° C. and relative humidity of 60%. After allowing the toner to stand, the extent of generation of toner aggregation was visually observed, and the storage property was evaluated in accordance with the following evaluation criteria. The results are shown in Table 4.

[Evaluation Criteria]
A: The aggregation is not found at all after 48 hours or even after 72 hours.
B: Although the aggregation is not found after 48 hours, the aggregation is found after 72 hours.
C: The aggregation is found within 48 hours.

Test Example 3

Durability

A toner was loaded to a printer "PAGEPRESTO N-4" (manufactured by CASIO COMPUTER CO., LTD., fixing: contact-fixing method, development method: nonmagnetic monocomponent development method, diameter of developer roller: 2.3 cm), and printing was conducted continuously on obliquely striped patterns having a print coverage of 5.5% under the environmental conditions of 32° C. and humidity of 85%. During the course of printing, black solid images were printed for every 500 sheets, and the presence or absence of the lines on the formed images was confirmed. At the point where the generation of the lines was confirmed, printing was stopped. The test was conducted up to 5,000 sheets at the maximum. Durability was evaluated by defining the number of printed sheets at the point where the generation of lines was visually confirmed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table 4.

[Evaluation Criteria]
A: No lines are generated up until printing 5,000 sheets.
B: Lines are generated on printing 2,000 sheets or more and less than 5,000 sheets.
C: Lines are generated on printing less than 2,000 sheets.

TABLE 4

| | Resin Binder | | | | Mixing Ratio of Resins | | | Charge | | | Charge | Other | External | Low-Temp. | Storage | Dura- |
|---|---|---|---|---|---|---|---|---|---|---|---|---|---|---|---|---|
| | Resin L | Lignin | Resin H | Lignin | Resin L | Resin H | Colorant | Control Agent | Wax | | Control Resin | Additive | Additive | Fixing Ability | Property | bility |
| Ex. 1 | A8 | 30 | A1 | 30 | 50 | 50 | A(5.0) | A(1.0) | A(2.0) | — | — | A(1.0) | A | A | A |
| Ex. 2 | A8 | 30 | A2 | 30 | 50 | 50 | A(5.0) | A(1.0) | A(2.0) | — | — | A(1.0) | A | A | A |
| Ex. 3 | A8 | 30 | A3 | 30 | 50 | 50 | A(5.0) | A(1.0) | A(2.0) | — | — | A(1.0) | A | A | A |
| Ex. 4 | A8 | 30 | A4 | 30 | 50 | 50 | A(5.0) | A(1.0) | A(2.0) | — | — | A(1.0) | A | A | A |
| Ex. 5 | A8 | 30 | A5 | 5 | 50 | 50 | A(5.0) | A(1.0) | A(2.0) | — | — | A(1.0) | A | A | B |
| Ex. 6 | A8 | 30 | A6 | 50 | 50 | 50 | A(5.0) | A(1.0) | A(2.0) | — | — | A(1.0) | B | A | A |

TABLE 4-continued

| | Resin Binder | | | | Mixing Ratio of Resins | | Colorant | Charge Control Agent | Wax | Charge Control Resin | Other Additive | External Additive | Low-Temp. Fixing Ability | Storage Property | Durability |
|---|---|---|---|---|---|---|---|---|---|---|---|---|---|---|---|
| | Resin L | Lignin | Resin H | Lignin | Resin L | Resin H | | | | | | | | | |
| Ex. 7 | A8 | 30 | A7 | 30 | 50 | 50 | A(5.0) | A(1.0) | A(2.0) | — | — | A(1.0) | A | A | A |
| Ex. 8 | A8 | 30 | — | — | 100 | — | A(5.0) | A(1.0) | A(2.0) | — | — | A(1.0) | A | B | B |
| Ex. 9 | — | — | A1 | 30 | — | 100 | A(5.0) | A(1.0) | A(2.0) | — | — | A(1.0) | B | A | A |
| Ex. 10 | A10 | 30 | A9 | 30 | 50 | 50 | A(5.0) | A(1.0) | A(2.0) | — | — | A(1.0) | B | A | A |
| Ex. 11 | A8 | 30 | A11 | 0 | 50 | 50 | A(5.0) | A(1.0) | A(2.0) | — | — | A(1.0) | A | A | B |
| Ex. 12 | A12 | 0 | A1 | 30 | 50 | 50 | A(5.0) | A(1.0) | A(2.0) | — | — | A(1.0) | A | A | B |
| Ex. 13 | A8 | 30 | H1 | 30 | 50 | 50 | A(5.0) | A(1.0) | A(2.0) | — | — | A(1.0) | B | B | A |
| Ex. 14 | A8 | 30 | H2 | 30 | 50 | 50 | A(5.0) | A(1.0) | A(2.0) | — | — | A(1.0) | B | B | A |
| Ex. 15 | A12 | 0 | A5 | 5 | 50 | 50 | A(6.0) | A(1.0) | A(2.0) | — | — | A(1.0) | A | A | B |
| Ex. 16 | A12 | 0 | A5 | 5 | 50 | 50 | B(6.0) | A(1.0) | A(2.0) | — | — | A(1.0) | A | A | B |
| Ex. 17 | A12 | 0 | A5 | 5 | 50 | 50 | C(6.0) | A(1.0) | A(2.0) | — | — | A(1.0) | A | A | B |
| Ex. 18 | A12 | 0 | A5 | 5 | 50 | 50 | D(6.0) | A(1.0) | A(2.0) | — | — | A(1.0) | A | A | B |
| Ex. 19 | A8 | 30 | A1 | 30 | 50 | 50 | A(5.0) | B(1.0) | A(2.0) | A(5.0) | — | A(1.0) | B | A | A |
| Ex. 20 | A8 | 30 | A1 | 30 | 50 | 50 | A(5.0) | A(1.0) | A(2.0) | — | — | B(1.0) | B | A | A |
| Ex. 21 | A8 | 30 | A14 | 30 | 50 | 50 | A(5.0) | A(1.0) | A(2.0) | — | — | A(1.0) | A | A | B |
| Ex. 22 | A8 | 30 | A15 | 30 | 50 | 50 | A(5.0) | A(1.0) | A(2.0) | — | — | A(1.0) | A | A | B |
| Comp. Ex. 1 | A12 | 0 | A11 | 0 | 50 | 50 | A(5.0) | A(1.0) | A(2.0) | — | — | A(1.0) | A | A | C |
| Comp. Ex. 2 | A12 | 0 | A13 | 0 | 50 | 50 | A(5.0) | A(1.0) | A(2.0) | — | — | A(1.0) | B | A | C |
| Comp. Ex. 3 | A12 | 0 | A11 | 0 | 50 | 50 | A(5.0) | A(1.0) | A(2.0) | — | A(5.0) | A(1.0) | A | A | C |

Remarks 1) In the resin binder, Resin L is a resin having a softening point of lower than 125° C., and Resin H is a resin having a softening point of 125° C. or higher.
Remarks 2) The numerical values for the colorant, the charge control agent, the releasing agent, the charge control resin, and other additive are expressed as a weight ratio based on 100 parts by weight of the resin binder. The numerical value for the external additive is expressed as a weight ratio based on 100 parts by weight of the toner particles before the treatment with the external additive.
Remarks 3) The numerical value for lignin is expressed as a weight ratio of the lignin compound based on 100 parts by weight of the raw material monomers of the polyester.

It can be seen from the above results that the toners of Examples 1 to 22 containing a resin binder obtained by polycondensing an alcohol component and a carboxylic acid component in the presence of a lignin compound are excellent in all of low-temperature fixing ability, storage property and durability of the toner, as compared to the toners of Comparative Examples 1 to 3.

INDUSTRIAL APPLICABILITY

The resin binder for a toner of the present invention is, for example, suitably used as a resin binder of a toner used in development and the like of latent images formed, for example, in electrophotography, electrostatic recording method, electrostatic printing method or the like.

The invention claimed is:

1. A toner for electrophotography comprising a resin binder and a pigment, wherein said resin binder is obtained by polycondensing at least one carboxylic acid component comprising from 1 to 30 mol % of a tricarboxylic or higher polycarboxylic acid compound and at least one alcohol component in the presence of a lignin compound,
    wherein a content of the pigment is from 1 to 10 parts by weight, based on 100 parts by weight of the resin binder, and
    wherein a content of the lignin compound is from 5 to 200 parts by weight, based on 100 parts by weight of the total amount of the at least one carboxylic acid component and the at least one alcohol component.

2. The toner according to claim 1, wherein the lignin compound has a weight-average molecular weight of from 300 to 500,000.

3. The toner according to claim 1, wherein the lignin compound is present in an amount of from 5 to 200 parts by weight, based on 100 parts by weight of the at least one carboxylic acid component and the at least one alcohol component.

4. The toner according to claim 1, wherein the at least one alcohol component comprises at least one alkylene oxide adduct of bisphenol A, at least one aliphatic diol, or both.

5. The toner according to claim 1, wherein the at least one carboxylic acid component comprises at least one aromatic dicarboxylic acid compound, at least one aliphatic dicarboxylic acid compound, or both.

6. A method for producing a toner, comprising polycondensing at least one carboxylic acid component comprising from 1 to 30 mol % of a tricarboxylic or higher polycarboxylic acid compound and at least one alcohol component in the presence of a lignin compound, and adding at least one pigment,
    wherein a content of the pigment is from 1 to 10 parts by weight, based on 100 parts by weight of the resin binder, and
    wherein a content of the lignin compound is from 5 to 200 parts by weight, based on 100 parts by weight of the total amount of the at least one carboxylic acid component and the at least one alcohol component.

7. The method according to claim 6, which comprises mixing a mixture of the lignin compound and the at least one alcohol component, and the at least one carboxylic acid component, polycondensing the components, and adding the at least one colorant.

8. The toner according to claim 1, wherein the at least one alcohol component comprises at least one alkylene oxide adduct of bisphenol A or the at least one alkylene oxide adduct of bisphenol A and at least one aliphatic diol.

9. The toner according to claim 1, wherein the polycondensing is conducted in the presence of a tin esterification catalyst.

10. The method according to claim 6, wherein the polycondensing is conducted in the presence of a tin esterification catalyst.

11. The toner according to claim 1, wherein the polycondensing is conducted in the presence of a pyrogallol promoter together with an esterification catalyst.

12. The method according to claim 6, wherein the polycondensing is conducted in the presence of a pyrogallol promoter together with an esterification catalyst.

13. The toner according to claim 11, wherein said pyrogallol promoter has a benzene ring in which three hydrogen atoms bound to carbon atoms adjacent to each other are substituted by hydroxyl groups.

14. The method according to claim 12, wherein said pyrogallol promoter has a benzene ring in which three hydrogen atoms bound to carbon atoms adjacent to each other are substituted by hydroxyl groups.

15. The toner according to claim 1, wherein the resin binder comprised at least one resin having a higher softening point and at least one resin having a lower softening point, wherein a difference between the higher softening point and the lower softening point is 10° C. or more.

16. The toner according to claim 15, wherein the higher softening point resin has a softening point within a range of temperatures of greater than 125° C. to 160° C. and the lower softening point resin has a softening point from 90° C. to a temperature of lower than 125° C.

17. The toner according to claim 1, wherein a weight ratio of the higher softening point resin to the lower softening point resin is from 1/3 to 3/1.

18. The toner according to claim 1, wherein the content of the lignin compound is from 15 to 200 parts by weight, based on 100 parts by weight of the total amount of the at least one carboxylic acid component and the at least one alcohol component, of the lignin compound.

19. The method according to claim 6, wherein the content of the lignin compound is from 15 to 200 parts by weight, based on 100 parts by weight of the total amount of the at least one carboxylic acid component and the at least one alcohol component, of the lignin compound.

* * * * *